United States Patent [19]

McMath

[11] Patent Number: 4,519,635

[45] Date of Patent: May 28, 1985

[54] QUICK CONNECT-DISCONNECT COUPLING

[75] Inventor: Jack A. McMath, Fort Thomas, Ky.

[73] Assignee: Dover Corporation, New York, N.Y.

[21] Appl. No.: 428,164

[22] Filed: Sep. 29, 1982

[51] Int. Cl.³ .............................................. F16L 35/00
[52] U.S. Cl. .................................... 285/93; 285/312; 29/428
[58] Field of Search ................. 285/312, DIG. 25, 93; 29/428

[56] References Cited

U.S. PATENT DOCUMENTS

| 2,478,586 | 8/1949 | Krapp | 285/173 |
| 2,757,944 | 8/1956 | Krapp . | |
| 2,770,256 | 11/1956 | Krapp | 137/614 |
| 2,770,474 | 11/1956 | Krapp | 284/18 |
| 3,314,698 | 4/1967 | Owens | 285/312 |
| 3,383,123 | 5/1968 | Murray | 285/83 |
| 3,976,313 | 9/1976 | Lauffanberger et al. | 285/84 |
| 4,295,670 | 10/1981 | Goodall et al. | 285/91 |

FOREIGN PATENT DOCUMENTS 1411596  8/1965  France ............................... 285/312

Primary Examiner—Dave W. Arola

Attorney, Agent, or Firm—Kinney and Schenk

[57] ABSTRACT

A quick connect-disconnect coupling for a fluid conduit structure and method of making same are provided wherein the conduit structure has cam devices for connecting and disconnecting a coupler member and an adapter member comprising the coupling and the cam devices cooperate during disconnection of the members to provide a disconnecting movement until a particular position is reached at which position the disconnecting movement is reversed and becomes an incremental connecting movement for a predetermined increment before allowing the members to be completely disconnected and in the event fluid under pressure is present in the conduit structure which has the coupler and adapter members connected therein the connecting movement of the cam devices is subjected to resistance by the fluid under pressure with the resistance being transmitted through the cam devices as an opposing force which serves to impede the incremental movement by resisting any opening force applied to the cam devices with such opposing force being detectable and once detected serves as a warning that the pressure of the fluid under pressure must be relieved before completely disconnecting the members.

24 Claims, 11 Drawing Figures

QUICK CONNECT-DISCONNECT COUPLING

BACKGROUND OF THE INVENTION

1. Field of the Invention

This invention relates to couplings and in particular to quick connect-disconnect couplings for fluid conduit means such as fluid conduits, fluid containers, vent pipes, and structures associated with these items.

2. Prior Art Statement

It is known in the art to provide a quick connect-disconnect coupling for fluid conduit means comprising a coupler member adapter to be connected in such conduit means and having a first tubular outer end and a first sealing surface, an adapter member adapted to be connected in the conduit means and having a second tubular outer end and a second sealing surface with the second tubular end being adapted to be receive within the first tubular end, cam means for connecting and disconnecting the members comprising first cam means operatively associated with the first tubular end and second cam means operatively associated with the second tubular end, and seal means disposed between the sealing surfaces for providing a fluid-tight seal betwen the members with the cam means connected. Because a quick connect-disconnect coupling having these features is so well known, particular references showing such a coupling will not be presented herein.

However, a quick connect-disconnect coupling of the character mentioned is usually employed in a system which carries fluid under pressure; and, it is desirable that the connected members of the coupling not be disconnected while containing such fluid under pressure to prevent loss or escape of the fluid and to assure that the disconnected ends of the coupling members do not create a whipping action which might cause injury to personnel or damage adjoining articles. Further, in instances where the fluid under pressure is a hazardous fluid by being flammable, toxic, or the like, any escape thereof may pose other problems.

To prevent escape of loss of fluid should connected members of a couping be improperly disconnected it has been proposed to utilize special valve means between a coupler member and an adapter member of such a coupling. Typical couplings which utilize such special valve means are disclosed in U.S. Pat. Nos. 2,770,256 and 2,770,474.

It has also been proposed to provide a quick connect-disconnect coupling of the character mentioned which employs cam members which are spring urged to a closed position to prevent inadvertent disconnection thereof and of the associated coupling members of such coupling and as disclosed in U.S. Pat. Nos. 2,478,586 and 3,314,698, for example.

In addition, it has been proposed in a quick connect-disconnect coupling of the character mentioned to provide means for holding cam members associated with coupling members of the coupling in a locked position to prevent inadvertent disconnection of the coupling member. For example, U.S. Pat. No. 3,976,313 discloses detent balls for holding the cam members locked and U.S. Pat. No. 4,295,670 discloses a special removable wire pin for holding such cam members locked.

Finally, it has been proposed in U.S. Pat. No. 3,383,123 to utilize piston actuated rods to prevent disconnection of coupling members of a coupling in the event fluid under pressure is present in the conduit system using such coupling.

However, each of the above-described prior art quick connect-disconnect couplings has deficiencies because it either has no means provided to warn an operator and thereby prevent disconnection of the coupling in the event the coupling is in a system containing fluid under pressure, or it uses complex means to prevent loss of fluid, or it uses complex means to prevent disconnection of the coupling and these latter complex means do not allow the coupling to be operated in a normal manner.

SUMMARY OF THE INVENTION

It is a feature of this invention to provide an improved quick connect-disconnect coupling for fluid conduit means which overcomes the above-mentioned deficiencies and wherein such improved coupling comprises a coupler member adapted to be connected in the conduit means and having a first tubular outer end and a first sealing surface, an adapter member adapted to be connected in the conduit means and having a second tubular outer end and a second sealing surface with the second tubular end being adapted to be received within the first tubular end, cam means for connecting and disconnecting the members and comprising first cam means operatively associated with the first tubular end and second cam means operatively associated with the second tubular end, and seal means disposed between the sealing surfaces for providing a fluid-tight seal between the members with the cam means connected.

In accordance with one embodiment of the improved coupling of this invention the first and second cam means cooperate during disconnection of the members to provide a disconnecting movement until a particular position is reached at which position the disconnecting movement is reversed and becomes an incremental connecting movement for a predetermined increment before allowing the members to be completely disconnected, and in the event fluid under pressure is present in the conduit means having the members connected therein the incremental connecting movement of the cam means is subjected to resistance by the fluid under pressure with the resistance being transmitted through the cam means as an opposing force which serves to impede the incremental movement by resisting any opening force applied to the cam means and with the opposing force being detectable and once detected serves as a warning that the pressure of the fluid under pressure must be relieved before completely disconnecting the members.

Accordingly, it is an object of this invention to provide an improved quick connect-disconnect coupling of the character mentioned.

Another object of this invention is to provide an improved method of making a quick connect-disconnect coupling of the character mentioned.

Another object of this invention is to provide improved cam means for connecting and disconnecting a coupler member and an adapter member of a quick connect-disconnect coupling wherein such improved cam means may be retrofitted on commercially available quick connect-disconnect couplings.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which.

DETAILED DESCRIPTION

Figure 1:
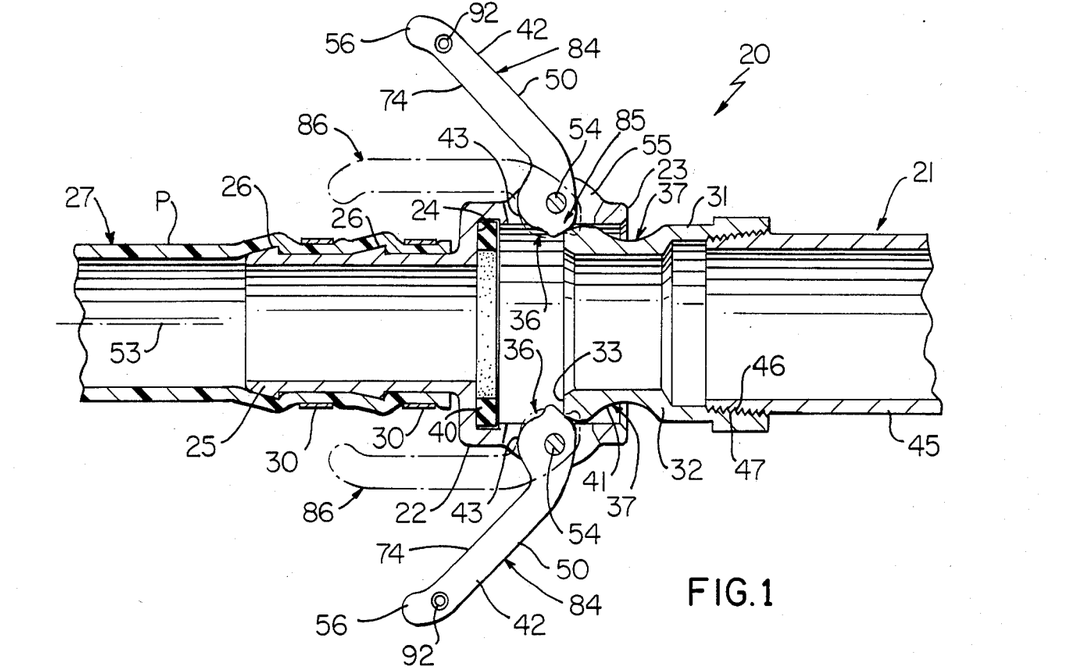
FIG. 1 is a view with parts in cross section, parts in elevation, and parts broken away illustrating one exemplary embodiment of a quick connect-disconnect coupling made in accordance with this invention and comprising a coupler member and an adapter member and showing initial entry of the adapter member within the coupler member with the associated position of a pair of cam levers provided on the coupler member being shown in solid lines and with the fully connected position of the cam levers being shown by dotted lines.
Figure 2:
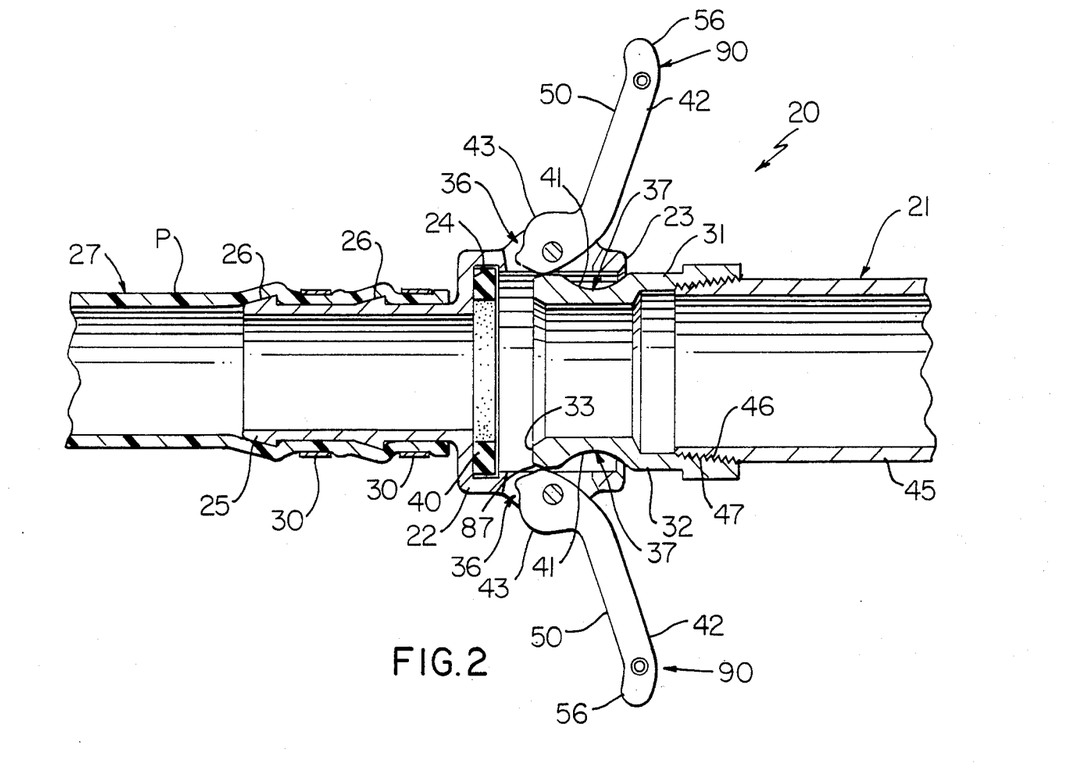
FIG. 2 is a view similar to FIG. 1 illustrating a further position of the adapter member within the coupler member and showing the cam levers pivoted about their pivot pins to provide unobstructed connecting movement of the adapter member.
Figure 3:
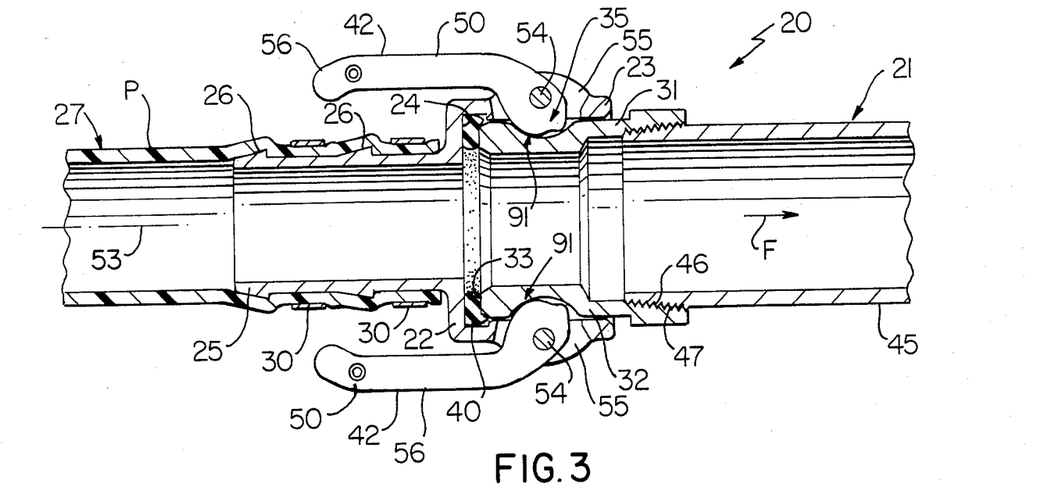
FIG. 3 is a view similar to FIG. 2 illustrating the coupler member and adapter member in their fully coupled position.

Reference is now made to FIGS. 1–3 of the drawings which illustrate one exemplary embodiment of a quick connect-disconnect coupling of this invention which is designated generally by the reference numeral 20. The coupling 20 is particularly adapted to be used in a fluid conduit means which in this example of the invention is shown as a fluid conduit system for conveying a fluid which may be in the form of a gaseous fluid, a liquid, a combination of a gas and liquid, a gas containing solid particles, a liquid containing solid materials (such as a slurry), or the like and such conduit means or system is designated generally by the reference numeral 21.

The coupling 20 comprises a coupler member 22 which is adapted to be connected in the conduit means or conduit system 21 and the coupler member 22 has a first tubular outer end in the form of an open outer end 23 and a first sealing surface shown as an annular sealing surface 24. The coupler member 22 may have an inner end portion of any suitable type known in the art and such inner end portion in this example comprises an inner end portion 25 having saw-toothed projections 26 extending from an outside surface thereof with the projections 26 being particularly adapted to receive a polymeric conduit 27, or the like, of the conduit system 21 thereover while being fastened in position by a plurality of spaced clamps 30.

The clamps 30 serve to urge the polymeric conduit 27, shown in this example by cross-hatching as being made of a plastic material P, inwardly against the projections 26 so that the polymeric conduit 27 is fastened in position by the hose clamps 30 so that it follows the saw-toothed contour defined by the projections 26 whereby the conduit 27 is held firmly in position. The plastic material P is preferably an elastomeric synthetic plastic material.

The coupling 20 also comprises what will be referred to as an adapter member 31 which is also adapted to be connected in the conduit means or system 21 and the adapter member 31 has a second tubular outer end 32 and a second sealing surface 33. The second tubular end 32 is particularly adapted to be received concentrically within the first tubular end 23. The coupler member 22 with its tubular end 23 is often popularly referred to as a female coupler member while the adapter member 31 with its tubular end 32 is often popularly referred to as a male coupler member.

The coupling 20 also has cam means which is designated generally by the reference numeral 35 in FIG. 3 of the drawings for connecting and disconnecting the coupler member 22 and adapter member 31. The cam means 35 comprises first cam means 36 (FIGS. 1 and 2) operatively associated with the first tubular end 23 of the coupler member and second cam means 37 operatively associated with the second tubular end 32 of the adapter member 31.

The coupling 20 also has seal means in the form of a seal 40 which is disposed between the sealing surfaces 24 and 33; and, the seal 40 provides a fluid-tight sealing structure between the coupler member 22 and adapter member 31 with the cam means 35 connected. The seal 40 in this example is shown by cross hatching as being made of rubber.

In accordance with the teachings of this invention the first cam means 36 and second cam means 37 cooperate during disconnection of the members 22 and 31 to provide a disconnecting movement until a particular position is reached, and in a manner to be described in detail subsequently, at which position the disconnecting movement for a predetermined increment before allowing the members to be completely disconnected. Further, as will also be described in detail subsequently, in the event fluid under pressure is present in the conduit means or system 21 having the members 22 and 31 connected therein the incremental connecting movement of the cam means 35 is subjected to resistance by the fluid under pressure with the resistance being transmitted through the cam means 35 as an opposing force which serves to impede the incremental movement by resisting any opening force applied to the cam means 35. The opposing force is detectable and once detected serves as a warning that the pressure of the fluid under pressure must be relieved before completely disconnecting the members 22 and 31.

Referring again to FIG. 2 of the drawings the second cam means 37 comprises an annular cam surface 41 and the first cam means comprises at least one cam lever 42 having a cooperating cam surface 43. The cam surface 43 is adapted to engage the annular cam surface 41 to provide the connecting and disconnecting of the coupling members 22 and 31.

The adapter member 31 of this example of the invention is threadedly fastened around a tubular conduit 45 in the form of a rigid metal conduit which comprises the conduit system 21. The adapter member 31 is threadedly fastened in position by female threads 46 provided therein which are adapted to receive male threads 47 provided on the terminal outer end portion of the tubular metal conduit 45.

As previously mentioned, the second cam means 37 is operatively associated with the second tubular outer end 32 of the adapter member 31; and, in this example of the invention the second cam means 37 is provided as an integral part of the second tubular outer end 32. In particular, the cam means 37 is defined integrally in member 31 as a concave and radially outwardly facing annular cam surface which as stated above is designated by the reference numeral 41; however, for simplicity of presentation such cam surface 41 may also be referred to herein as cam surface 37 and/or cam means 37.

Figure 9:
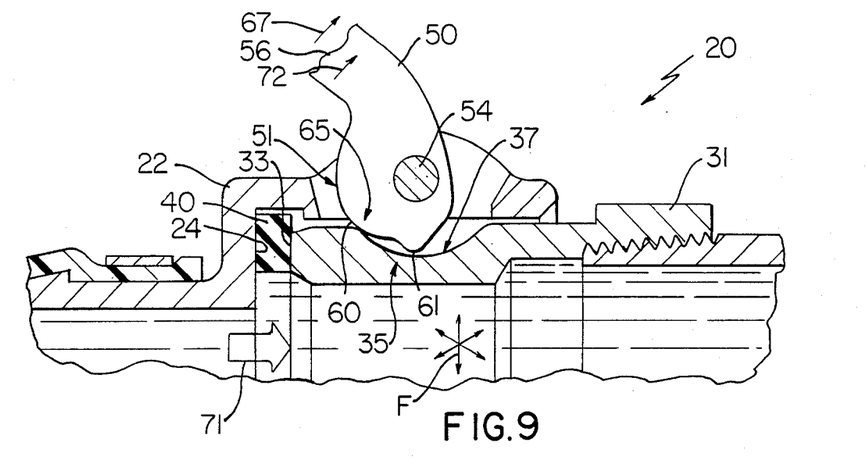
FIG. 9 is a greatly enlarged fragmentary view particularly illustrating the upper portion of the coupler member and adapter member of the coupling as illustrated in FIG. 4 and particularly highlighting the cam surfaces thereof and showing the action of fluid pressure in the associated conduit system by force arrow.

The first cam means 36 comprises a plurality of two cam levers each designated by the same reference numeral 50 as shown in FIG. 1; and, as best seen in FIG. 9 for the top lever, each cam lever 50 has a convex cam surface 51. The convex cam surfaces 51 are adapted to engage the concave cam surface 37 and cooperate therewith to provide the connecting and disconnecting movements of members 22 and 31.

The tubular outer end 32 of member 31 is adapted to be received concentrically within the tubular outer end 23 of member 22 about a common longitudinal axis 53 as shown in FIG. 3. The axis 53 defines a flow axis for the members 22 and 31 and, in particular, a flow axis for fluid flowing through or contained in the members 22 and 31 with such members in their connected position.

As seen in FIG. 3 each of the cam levers 50 is detachably fastened by an associated pivot pin 54 in an associated cut out 55 in the coupler member 22 for pivoting movement about its pivot pin 54. Each pivot pin 54 is disposed substantially perpendicular to the axis 53. The exemplary coupling 20 utilizes a plurality of two cam levers 50 whereby two cutouts 55 and two pivot pins 54 are provided in the tubular outer end 23. The cutouts 55 are provided in outer end 23 at substantially diametrically opposed positions whereby the cam levers 50 are mounted by their pins 54 at the corresponding positions and a pair of aligned cylindrical bores (not shown) are provided the outer end 23 on opposite sides of each cutout 55 for receiving associated ends of an associated pivot pin 54.

Referring again to FIG. 3 it is seen that each of the cam levers 50 has a handle 56 for movement thereof and such handle is disposed substantially along the coupler member 22 parallel to the axis 53 and inwardly of the tubular outer end 23. In this example, the handles 56 of the cam levers 50, in essence, overlie the seal 40 with the cam levers in their connected position.

The handles 56 are adapted to provide an opening force to disconnect the coupling members 22 and 31 and such opening force is provided by pivoting the handles about their pivot pins 54 toward the outer end 23 of the coupler member 22.

Figures 4, 7:
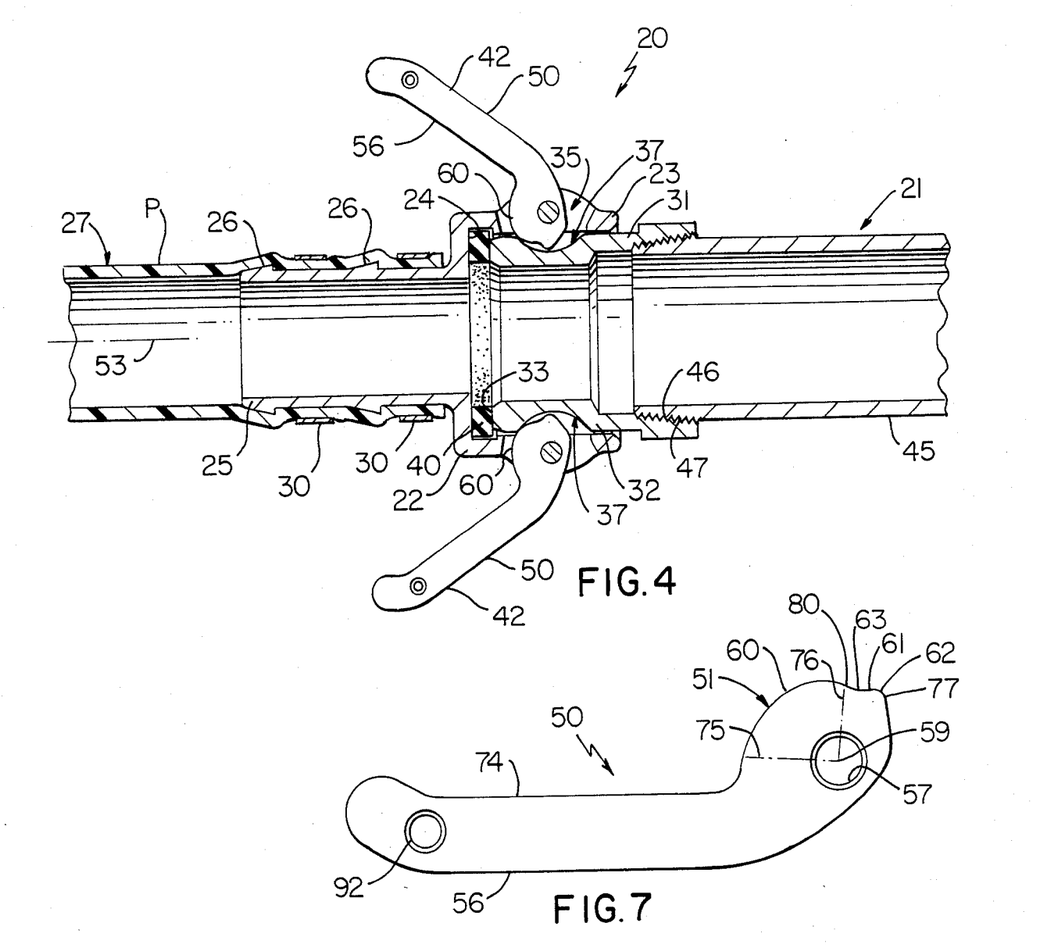
FIG. 4 is a view similar to FIG. 3 showing the cam levers in what will be referred to as an intermediate cam position which is reached during uncoupling of the members from their fully coupled position.
FIG. 7 is a view of a typical one of the cam levers looking parallel to the pivot axis thereof.

As will be readily apparent from FIG. 7 of the drawings each of the cam levers 50 has a cylindrical bore 57 for receiving an associated pivot pin 54 therethrough. The bore has a central axis 59 which defines a pivot axis for its cam lever 50. Each of the convex cam surfaces 51 comprises a smooth curved surface 60, an abrupt curved surface 61 which is defined by an abrupt projection 62 disposed adjacent an end of the smooth curved surface and extending away from the pivot axis 59, and a transition surface 63 between the end of the smooth curved surface 60 and the abrupt curved surface 61.

Figure 10:
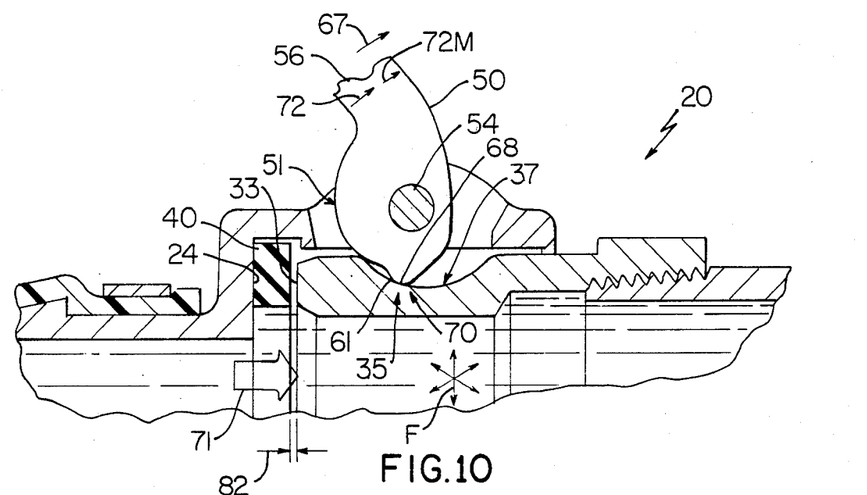
FIG. 10 is a greatly enlarged view of the coupling portions illustrated in FIG. 9 in the position illustrated in FIG. 5.

The smooth curved surface 60 is particularly adapted to engage a part of the annular concave surface 37, as illustrated in FIG. 4 and better illustrated at 65 in FIG. 9, to provide an axial disconnecting or intermediate cam movement whereby the members 22 and 31 are moved away from each other until a particular axial position, i.e., the position of FIG. 10, is reached. It should be noted that 11 of the uncoupling action or action to disconnect the coupling 20 is produced by moving or pivoting the outer ends of the cam levers away from the axis 53. This movement is illustrated by arrows 67 for the top cam lever in FIGS. 9, 10 and 11.

The position of FIG. 10 will be referred to as the pressure lock or pressure detent position, and at this position the disconnecting movement, i.e., movement to disconnect the coupling 20 is reversed whereby further movement of the outer ends of the cam levers 50 starts what has been referred to as an incremental axial connecting movement. During this incremental connecting movement instead of the members 22 and 31 being further disconnected they are actually moved axially in a connecting manner toward each other and thus are subject to a reverse cam action. During this reverse cam action the sealing surfaces 24 and 33 move closer together. The approximate conclusion of the reverse cam action is shown in FIG. 11 and with movement of the cam levers 50 to positions slightly beyond the position shown for the top lever 50 in FIG. 11, the members 22 and 31 may be completely disconnected and moved apart in the usual manner.

The incremental connecting movement is provided by the abrupt curved surface 61 engaging another part 68 of the cam surface 37 as shown at 70 in FIG. 10 to provide the incremental connecting movement. However, in the event fluid under pressure is provided in the conduit system 21, with the members 22 and 31 connected as illustrated in FIG. 3, the incremental connecting movement provided by the cam means 35 and in particular the incremental connecting movement provided by the abrupt curved surface 61 engaging the annular surface 37 is subjected to resistance by any fluid under pressure contained within the conduit system and for simplicity such pressurized fluid is indicated schematically by a cluster of arrows F in FIGS. 9, 10, and 11. The resistance to incremental connecting movement is an opposing force indicated schematically in FIG. 10 by a force arrow 71.

Figure 11:
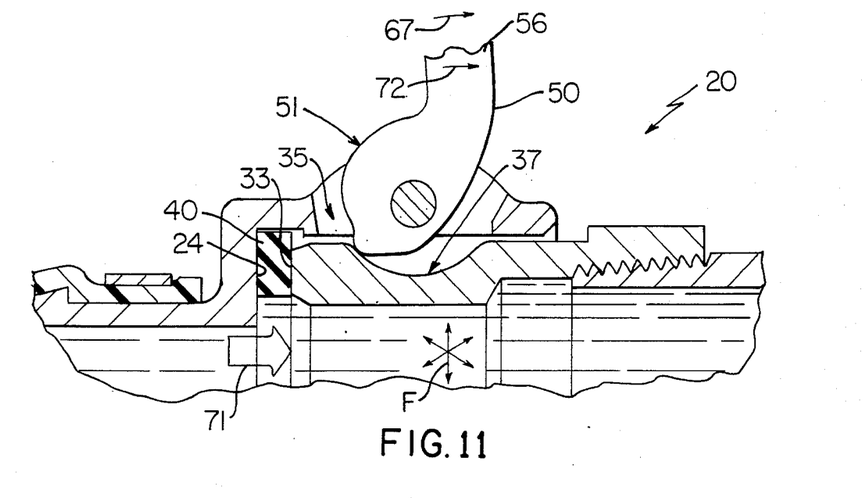
FIG. 11 is a greatly enlarged view of the coupling portions illustrated in FIG. 9 in the position of FIG. 6 with fluid pressure in the conduit system.

The resistance 71 is transmitted through the cam means 35 to the handles 56 of the cam levers 50 and serves to impede the incremental movement from the position of FIG. 10 to the position of FIG. 11, and slightly beyond, by resisting the opening force 72 applied against the handles 56 of the cam levers 50. The opening force is indicated schematically by arrow 72 in FIGS. 9 through 11 in top lever 50. The opposing force 71 is detectable and once detected serves as a warning that the pressure of the fluid under pressure of pressurized fluid F must be relieved before completely disconnecting the members 22 and 31.

To make possible the movement described above, each of the convex cam surfaces 51, (FIG. 7) has the smooth curved surface 60 thereof disposed relative to an axis such as the pivot axis 59 which gradually decreases in dimension or radius in a direction away from the inside surface 74 of its handle 56. This dimensional construction for surface 60 corresponds roughly to similar constructions of prior art couplings. Thus, it is seen that the smooth curved surface 60 decreases in radius from pivot axis 59 with angular displacement of the radius from exemplary location 75 to location 76.

In the example of the invention the abrupt surface 61 of each cam surface 51 has an outer portion 77 which comprises a part of a first right circular cylindrical surface and the transition surface 63 comprises a part of a second right circular cylindrical surface and blends smoothly with the smooth curved surface 60 and the abrupt surface 61. The blending takes place at an approximate location 80 on the cam surface 51. The convex cam surfaces 51 with their cooperating surface portions comprising same as described herein make possible the unique action heretofore unknown, of the cam levers 50. Further, the operation of such cam levers is a smooth operation.

However, the coupling 20 of this invention is basically a safe coupling due to the unique manner in which there is a resistance or opposing force 71 to the usual uncoupling action which opposing force 71 occurs if pressure is present in the system 21 using the coupling 20. The resistance or opposing force 71 required that additional work be done beyond the normal work required to disconnect the coupling normally whereby the opening force 72 must be increased in magnitude by an amount 72M, shown only in FIG. 10, to enable further disconnecting movement from the position of FIG. 10 to the position of FIG. 11 and slightly beyond. This need to increase the opening force 72 by the magnitude 72M is obviously detectable.

Each of the cam levers 50 may be of any suitable construction; however, preferably in this example each lever 50 with its convex surface 51 is defined as a single-piece structure and preferably made of a suitable metallic material. In addition, the members 22 and 31 and pivot pins 54 are also preferably made of a suitable metal.

The seal means or annular seal 40 may be made of any suitable material known in the art which is compatible with the pressurized fluid F being conveyed in the conduit system 21. Preferably the seal 40 is made of a compressible resilient elastomeric material.

Figures 5, 6, 8:
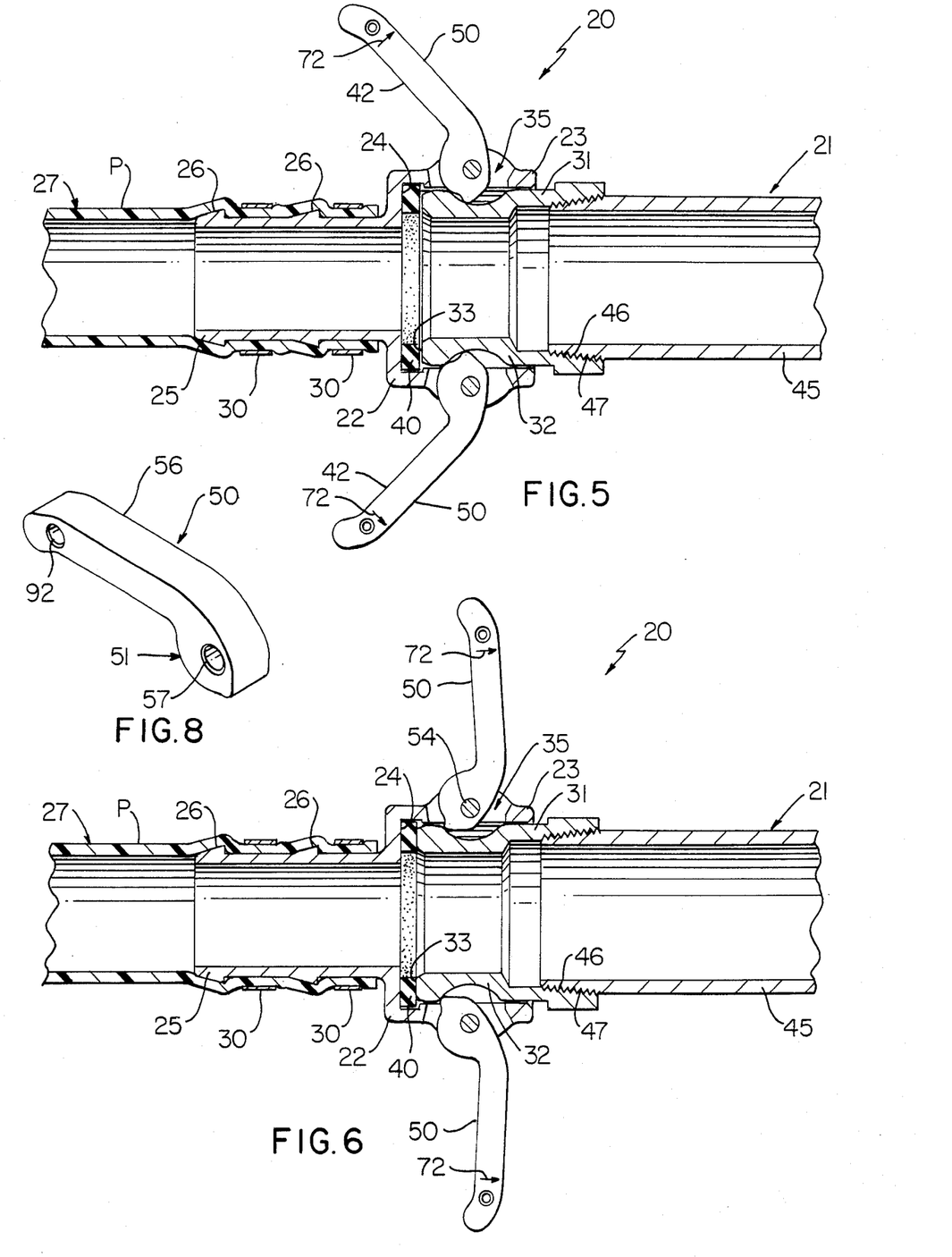
FIG. 5 is a view similar to FIG. 4 showing the cam levers in what will be referred to as a pressure detent or lock position at which position further disconnecting movements of the cam levers starts what will be referred to as a reverse cam action.
FIG. 6 is a view similar to FIG. 5 showing that the reverse cam action of the cam levers provided by further disconnecting movement of the cam levers produces an incremental connecting movement of the coupling member.
FIG. 8 is an isometric view of the cam lever of FIG. 7.

For ease of presentation in this disclosure and to facilitate understanding this invention, the seal 40 is shown in FIGS. 5 and 10 with a slight axial space between the sealing surface 33 and the near surface of such seal. This axial space is designated by the reference numeral 82 only in FIG. 10.

In this disclosure a plurality of two cam levers 50 comprise the coupling and each is provided with a convex cam surface 51 which is in turn defined by a plurality of cooperating surfaces. However, it is to be understood that a plurality of more than two cam levers may be provided if desired.

The quick connect-disconnect coupling 20 is described as being for fluid conduit means which in this example is in the form of a fluid conduit system 21. However, it is to be understood that the coupling 20 may be provided in association with conduit means in the form of a tank or pressure vessel, a vent system, a fluid conduit system having fluid conveying conduits and the fluid contained in these components may be a gaseous fluid, a liquid, a combination or mixture of a liquid and a gas, a gas containing solid particles, a liquid containing solid materials (such as a slurry), or the like.

The fluid under pressure is detectable by increased resistance to manual opening movements of the cam levers in moving from the position of FIG. 9 through the positions of FIGS. 10, 11. Thus, an operator will sense or detect that to move from the position of FIG. 9 to the position of FIG. 10, for example, greater opening force of a magniture 72M is required. This manual detection serves as a warning to the operator whereby such operator is then in a position to relieve the pressure using any means or technique known in the art before disconnecting the coupling 20.

The opposing force or resistance 71 to movement increases as the effective flow area through the members 22 and 31 increases. Thus, for an effective flow area equivalent to less than an inch in diameter, a particular opposing force would be transimitted which would have to be overcome by an increased force 72M in the event a substantial pressure is present in the conduit system. However, as the above-mentioned flow area increases substantially and even with a modest pressure in the associated system the opposing force 71 becomes so great that any reverse incremental connecting movement is practically impossible using manual means whereby the coupling 20 literally becomes a self-controlled and self-contained safe coupling.

It will be appreciated that the above features are made possible due to fluid pressure in the conduit system acting on the unique cam means 35 of this invention. In addition, there are no special operating procedures for the cam levers 50 or special fastening requirements. Instead, the cam levers 50 are operated in a similar manner as prior art cam levers, yet such cam levers and other members of the cam means provide the previously described action.

In this disclosure of the invention the abrupt surface 61 is defined by a projection 62 which is provided as an integral part of the cam lever 50 as a single-piece structure. However, it is to be understood that the projection 62 and the abrupt cam surface together with the remainder of the convex cam surface 51 may be provided by any suitable means. For example, the projection 62 may be suitably attached in position on the cam lever 50 and one technique for defining and attaching projection 62 is to define same as a high strength weld bead which is then ground or otherwise machined to precise dimensions.

The adapter member 31 with its tubular outer end 32 and annular cam means or annular cam surface 37 is basically a standard construction which is well known in the art and does not vary substantially from one manufacturer to another. However, the coupler member 22 does vary from manufacturer to manufacturer and indeed it is important that the coupler member 22 be constructed with its cam levers 50 provided with unique cam surfaces 51 so as to provide the cam movement previously described.

To assure that the coupling 20 operates in a desired manner it is important that the distance between the two cam arm pivot pins 54 be held within a precisely controlled dimensional tolerance. In addition, the location of the two cam arm pivot pins 54 and in particular the distance of each axis 59 from the sealing surface 24 must be within a close predetermined tolerance range. Finally, the axial thickness of the seal 40 and dimensional disposition of the sealing surface 33 with the adapter member 31 connected in position must be maintained with precise dimensional tolerances.

Thus, it is clear that the coupling 20 of this invention is of simple and economical construction yet is essentially a safe coupling due to the unique manner in which, with the coupling installed in position in an associated system, fluid pressure may be readily detected by an operator.

The coupling 20 of this invention does not require special latches, does not utilize complex interlocks, and does not require hitch pins, or the like. With respect to these items, it is well known that prior art couplings of this type which utilize latches, interlocks, and hitch pins cannot operate normally and thus in providing increased safety introduce what may be considered nuisance characteristics. However, the coupling device 20 of this invention is free of any nuisance characteristics and operates in a similar manner as simple prior art couplings.

The quick connect-disconnect coupling of this invention is also constructed so that it is not necessary to touch or move the cam levers 50 to enable easy entry of the adapter member 31 within the coupler member. FIG. 1 shows initial entry of the adapter member 31 within the coupler member 22 with the associated position of a pair of cam levers provided on the coupler member being shown in solid lines at 84 and with the fully connected position of the cam levers 50 being shown by dotted lines at 86. The cam levers 50 are moved by the beveled edge 87 of the adapter member 31 engaging the cam levers 50 and pivoting same about their pivot pins 54.

A further position of the adapter member 31 within the coupler member 22 is shown in FIG. 2 wherein the cam levers 50 are shown further pivoted about their pivot pins 54 so as to enable unobstructed yet complete connecting movement of the adapter member 31 whereby the sealing surface 33 is urged against the seal 40 sandwiching same against sealing surface 24. The cam levers 50 are then moved manually toward the coupler member 22 to their fully coupled position which as mentioned before is shown in FIG. 3. In this latter position the portions 60 of the cam surfaces 51 engage the cam surface 37 as shown at 91 to provide the coupled or fastened position of the coupling 20.

Each cam lever 50 of the coupling 20 is provided with an opening or hole 92 in the end of its arm 56. Each hole 92 is for the purpose of fastening an arm against movement once the coupling is connected or fastened in its coupled position of FIG. 3. Each hole 92 may be used to pass a fastening wire, or the like, therethrough.

The cam levers 50 of the coupling 20 operate in a similar manner whether the fluid in the conduit system is a compressible fluid such as air or a non-compressible fluid such as a liquid.

In this disclosure of the invention reference is made to cam means 35 and such cam means may also be referred to in the claims as cam device 35. The cam means or device 35 comprises first cam means 36 operatively associated with or on the coupler member and second cam means 37 operatively associated with the adapter member. However, it will be appreciated that the cam means 36 and 37 may be modified, reversed, and provided on the adapter member and coupler member respectively by suitably modifying the adjoining structure provided that such cam means still operate in the manner described in detail herein.

The above description has used terms such as top, upper, outer, inner and the like. However, it is to be understood that these and similar terms merely refer to components as shown in the drawings and are not to be considered limiting in any way.

While present exemplary embodiments of this invention, and methods of practicing the same have been illustrated and described, it will be recognized that this invention may be otherwise variously embodied and practiced within the scope of the following claims.

What is claimed is:

1. In a quick connect-disconnect coupling for fluid conduit means comprising, a coupler member adapted to be connected in said conduit means and having a first tubular outer end and a first sealing surface, an adapter member adapted to be connected in said conduit means and having a second tubular outer end and a second sealing surface, said second tubular end being adapted to be received within said first tubular end, cam means for connecting and disconnecting said members comprising first cam means carried by said first tubular end and second cam means carried by said second tubular end, and seal means disposed between said sealing surfaces for providing a fluid-tight seal between said members with said first and second cam means connected and with said members being in a first axial position thereof, said first and second cam means respectively having cam surfaces, one of said first and second cam means being movable relative to its respective tubular outer end in one direction of continuous opening movement thereof from a fully connected position of its said cam surface with said cam surface of the other of said first and second cam means with said members in said first axial position thereof to a fully disconnected position of said cam surfaces so that said members can be completely disconnected from each other, the improvement in which said cam surfaces of said first and second cam means act against each other during disconnection of said members as said one cam means is being continuously moved through said opening movement thereof to provide an axial disconnecting movement of said members from said first axial position thereof until a particular second axial position is reached at which second axial position the disconnecting movement of said members is reversed and becomes an incremental axial connecting movement for a predetermined increment to a third axial position of said members before allowing said members to be completely disconnected whereby in the event fluid under pressure is present in said conduit means having said members connected therein said incremental connecting movement of said members is subjected to resistance by said fluid under pressure, said resistance being transmitted through said members as an opposing force which serves to impede said incremental movement by resisting any opening force applied to said one cam means, said opposing force being detectable and once detected serves as a warning that the pressure of said fluid under pressure must be relieved before completely disconnecting said members.

2. A coupling as set forth in claim 1 in which said cam surface of said second cam means comprises an annular cam surface and said first cam means is said one cam means and comprises at least one cam lever having said cam surface of said first cam means which is adapted to engage said annular cam surface to provide said connecting and disconnecting of said members.

3. A coupling as set forth in claim 1 in which said second cam means is carried by said second tubular end by being provided as an integral part thereof and said cam surface thereof is provided as a concave radially outwardly facing annular cam surface and said first cam means is said one cam means and comprises a plurality of cam levers each having a convex cam surface, said convex cam surfaces comprising said cam surface of said first cam means and being adapted to engage said concave cam surface and cooperating therewith to provide said connecting and disconnecting of said members.

4. A coupling as set forth in claim 3 in which said second tubular end is adapted to be received concentrically within said first tubular end about a common longitudinal axis which defines a flow axis for said members in their connected position, each of said cam levers being detachably fastened by an associated pivot pin in an associated cutout in said coupler member for pivoting movement about its pivot pin, and each of said pivot pins being disposed perpendicular to said axis.

5. A coupling as set forth in claim 4 in which each of said cam levers has a handle for movement thereof, each handle is disposed substantially along said coupler member parallel to said axis and inwardly of its outer end, said handles are adapted to provide said opening force, and once said opposing force is detected by the occurrence of a substantial increase in the magnitude of said opening force said warning is provided.

6. A coupling as set forth in claim 5 in which each of said handles is adapted to be pivoted about its pivot pin toward the outer end of its coupler member to provide a disconnecting movement.

7. A coupling as set forth in claim 6 in which each of said cam levers has a cylindrical bore for receiving an associated pivot pin therethrough, each bore defining a pivot axis for its cam lever, each of said convex cam surfaces comprising a smooth curved surface, an abrupt curved surface defined by an abrupt projection adjacent an end of said smooth curved surface and extending away from said pivot axis, and a transition surface between said end of said smooth curved surface and said abrupt curved surface, said smooth curved surface engaging a part of said annular concave surface to provide said disconnecting movement and said abrupt curved surface engaging another part of said annular concave surface to provide said incremental connecting movement.

8. A coupling as set forth in claim 7 in which each of said convex cam surfaces has the smooth curved surface thereof disposed relative to an axis which gradually decreases in radius in a direction away from the inside surface of its handle, said abrupt surface has an outer portion which comprises a part of a first right circular cylindrical surface, and said transition surface comprises a part of a second right circular cylindrical surface and blends smoothly between said smooth curved surface and said abrupt surface.

9. A coupling as set forth in claim 8 in which each of said cam levers with its convex surface is defined as a single-piece structure.

10. A coupling as set forth in claim 8 in which each of said members, said cam levers, and said pivot pins are made of metal.

11. A coupling as set forth in claim 8 in which said seal means is made of a compressible resilient elastomeric material.

12. A coupling as set forth in claim 11 in which said seal means is an annular seal and each pivot pin of each cam lever has a pivot axis supported at a predetermined position on said first tubular outer end of the coupler member which takes into account the location of said first sealing surface, the dimensional configuration and character of said annular seal, and the location of said second cam means and second sealing surface relative thereto.

13. In a method of making a quick connect-disconnect coupling for fluid conduit means comprising the steps of, providing a coupler member adapted to be connected in said conduit means and having a first tubular outer end and a first sealing surface, providing an adapter member adapted to be connected in said conduit means and having a second tubular outer end and a second sealing surface, said second tubular end being adapted to be received within said first tubular end, providing cam means for connecting and disconnecting said members which comprise first cam means carried by said first tubular end and second cam means carried by said second tubular end, providing seal means disposed between said sealing surfaces for providing a fluid-tight seal between said members with said first and second cam means connected and with said members being in a first axial position thereof, forming said first and second cam means to respectively have cam surfaces, and forming one of said first and second cam means to be movable relative to its respective tubular outer end in one direction of continuous opening movement thereof from a fully connected position of its said cam surface with said cam surface of the other of said first and second cam means with said members in said first axial position thereof to a fully disconnected position of said cam surfaces so that said members can be completely disconnected from each other, the improvement in which said step of providing cam means comprises providing said cam surfaces of said first and second cam means to act against each other during disconnection of said members as said one cam means is being continuously moved through said opening movement thereof to provide an axial disconnecting movement of said members from said first axial position thereof until a particular second axial position is reached at which second axial position the disconnecting movement of said members is reversed and becomes an incremental axial connecting movement for a predetermined increment to a third axial position of said members before allowing said members to be completely disconnected whereby in the event fluid under pressure is present in said conduit means having said members connected therein said incremental connecting movement of said members is subjected to resistance by said fluid under pressure, said resistance being transmitted through said members as an opposing force which serves to impede said incremental movement by resisting any opening force applied to said one cam means, said opposing force being detectable and once detected serves as a warning that the pressure of said fluid under pressure must be relieved before completely disconnecting said members.

14. A method as set forth in claim 13 in which said step of forming said cam surfaces comprises providing said cam surface of said second cam means to comprise an annular cam surface and providing said first cam means to be said one cam means and comprise at least one cam lever having said cam surface of said first cam means which is adapted to engage said annular cam surface to provide said connecting and disconnecting of said members.

15. A method as set forth in claim 13 in which said step of providing said second cam means to be carried by said second tubular end provides said cam surface thereof to be as an integral part thereof and as a concave radially outwardly facing annular cam surface and said step of providing said first cam means comprises the step of providing a plurality of cam levers that comprise said one cam means and each having a convex cam surface, said convex cam surfaces comprising said cam surface of said first cam means and being adapted to engage said concave cam surface and cooperating therewith to provide said connecting and disconnecting of said members.

16. A method as set forth in claim 15 in which said step of providing said adapter member comprises providing said second tubular end thereof which is adapted to be received concentrically within said first tubular end about a common longitudinal axis which defines a flow axis for said members in their connected position, detachably fastening each of said cam levers by an associated pivot pin in an associated cutout in said coupler member for pivoting movement about its pivot pin, and disposing each of said pivot pins perpendicular to said axis.

17. A method as set forth in claim 16 in which said step of providing said first cam means comprises providing each of said cam levers having a handle for movement thereof, each handle being disposed substantially along said coupler member parallel to said axis and inwardly of its outer end, said handles being adapted to provide said opening force, and once said opposing force is detected by the occurrence of a substantial increase in the magnitude of said opening force said warning is provided.

18. A method as set forth in claim 17 in which said step of providing said first cam means comprises providing each of said handles of said first cam means which is adapted to be pivoted about its pivot pin toward the outer end of its coupler member to provide a disconnecting movement.

19. A method as set forth in claim 18 in which said step of providing said first cam means comprises providing each of said cam levers having a cylindrical bore defining a pivot axis for its cam lever, each of said convex cam surfaces comprising a smooth curved surface, an abrupt curved surface defined by an abrupt projection adjacent an end of said smooth curved surface and extending away from said pivot axis, and a transition surface between said end of said smooth curved surface and said abrupt curved surface, said smooth curved surface being adapted to engage a part of said annular concave surface to provide said disconnecting movement and said abrupt curved surface being adapted to engage another part of said annular concave surface to provide said incremental connecting movement.

20. A method as set forth in claim 19 in which said step of providing said first cam means comprises providing each of said convex cam surfaces having the smooth curved surface thereof disposed relative to an axis which gradually decreases in radius in a direction away from the inside surface of its handle, said abrupt surface having an outer portion which comprises a part of a first right circular cylindrical surface and said transition surface comprising a part of a second right circular cylindrical surface and blending smoothly between said smooth curved surface and said abrupt surface.

21. A method as set forth in claim 20 in which said step of providing said first cam means comprises providing each of said cam levers with its convex surface defined as a single-piece structure.

22. A method as set forth in claim 20 in which said steps of providing said members, said cam levers, and said pivot pins comprises providing these components of metal.

23. A method as set forth in claim 20 in which said step of providing seal means comprises providing said seal means made of compressible resilient elastomeric material.

24. A method as set forth in claim 20 in which said step of providing said seal means comprises providing said seal means as an annular seal.

* * * * *